US008278619B2

(12) United States Patent
Makarov et al.

(10) Patent No.: US 8,278,619 B2
(45) Date of Patent: Oct. 2, 2012

(54) MASS SPECTROMETRY

(75) Inventors: Alexander Alekseevich Makarov, Cheshire (GB); Eduard V. Denisov, Bremen (DE); Gerhard Jung, Delmenhorst (DE); Alexander Kholomeev, Bremen (DE); Oliver Lange, Bremen (DE)

(73) Assignee: Thermo Finnigan LLC, San Jose, CA (US)

( * ) Notice: Subject to any disclaimer, the term of this patent is extended or adjusted under 35 U.S.C. 154(b) by 351 days.

(21) Appl. No.: 12/762,140

(22) Filed: Apr. 16, 2010

(65) Prior Publication Data

US 2010/0193680 A1 Aug. 5, 2010

Related U.S. Application Data

(63) Continuation of application No. 11/909,857, filed as application No. PCT/GB2006/001125 on Mar. 29, 2006, now Pat. No. 7,728,288.

(51) Int. Cl.
*B01D 59/44* (2006.01)
*H01J 49/00* (2006.01)

(52) U.S. Cl. ........ 250/282; 250/281; 250/283; 250/287; 250/288; 250/290; 250/291; 250/292; 435/7.1; 435/173

(58) Field of Classification Search .......... 250/281–283, 250/287–292; 435/7.1, 173
See application file for complete search history.

(56) References Cited

U.S. PATENT DOCUMENTS

| | | | | |
|---|---|---|---|---|
| 5,420,425 | A | 5/1995 | Bier | |
| 6,545,268 | B1 * | 4/2003 | Verentchikov et al. | 250/287 |
| 6,753,523 | B1 | 6/2004 | Whitehouse et al. | |
| 6,987,264 | B1 | 1/2006 | Whitehouse | |
| 7,026,610 | B2 | 4/2006 | Kato | |
| 7,145,133 | B2 * | 12/2006 | Thomson | 250/281 |

FOREIGN PATENT DOCUMENTS

| | | |
|---|---|---|
| JP | Hei 7-326321 | 12/1995 |
| JP | 2002-517070 | 2/2002 |
| JP | 2003-242926 | 8/2003 |
| JP | 2004-281350 | 10/2004 |

* cited by examiner

*Primary Examiner* — Jack Berman
*Assistant Examiner* — Meenakshi Sahu
(74) *Attorney, Agent, or Firm* — Charles B. Katz

(57) ABSTRACT

This invention relates to a mass spectrometer including a reaction cell and to a method of using such a mass spectrometer. In particular, although not exclusively, this invention relates to a tandem mass spectrometer and to tandem mass spectrometry. The invention provides a method of mass spectrometry using a mass spectrometer having a longitudinal axis, comprising guiding ions to travel along the longitudinal axis of the mass spectrometer in a forwards direction to pass through an intermediate ion store and then to enter a reaction cell, to process the ions within the reaction cell, to eject the processed ions to travel back along the longitudinal axis to enter the intermediate ion store once more, and to eject one or more pulses of the processed ions in an off-axis direction to a mass analyser.

14 Claims, 2 Drawing Sheets

MASS SPECTROMETRY

CROSS-REFERENCE TO RELATED APPLICATIONS

The present application is a continuation under 35 U.S.C. §120 and claims the priority benefit of U.S. patent application Ser. No. 11/909,857, filed Sep. 27, 2007 now U.S. Pat. No. 7,728,288, which is a National Stage application under 35 U.S.C. §371 of PCT Application No. PCT/GB2006/001125, filed Mar. 29, 2006, entitled "Improvements relating to Mass Spectrometry". The disclosures of each of the foregoing applications are incorporated herein by reference.

FIELD OF THE INVENTION

This invention relates to a mass spectrometer including a reaction cell and to a method of using such a mass spectrometer. In particular, although not exclusively, this invention relates to a tandem mass spectrometer and to tandem mass spectrometry.

BACKGROUND OF THE INVENTION

In general, a mass spectrometer comprises an ion source for generating ions from molecules to be analysed, and ion optics for guiding the ions to a mass analyser. A tandem mass spectrometer further comprises a second mass analyser. In tandem mass spectrometry, structural elucidation of ionised molecules is performed by using the first mass analyser to collect a mass spectrum, then using the first mass analyser to select a desired precursor ion or ions from the mass spectrum, ejecting the chosen precursor ion(s) to a reaction cell where they are fragmented, and transporting the ions, including the fragmented ions, to the second mass analyser for collection of a mass spectrum of the fragment ions. The method can be extended to provide one or more further stages of fragmentation (i.e. fragmentation of fragment ions and so on). This is typically referred to as MSn, with n denoting the number of generations of ions. Thus MS2 corresponds to tandem mass spectrometry.

Tandem mass spectrometers can be classified into three types:

(1) sequential in space, corresponding to combinations of transmitting mass analysers (e.g. magnetic sectors, quadrupole, time-of-flight (TOF), usually with a collision cell in-between);

(2) sequential in time, corresponding to stand-alone trapping mass analysers (e.g. quadrupole, linear, Fourier transform ion cyclotron resonance (FT-ICR), electrostatic traps); and (3) sequential in time and space, corresponding to hybrids of traps and transmitting mass analysers.

Most tandem mass spectrometers have different stages of mass analysis following each other along a common axis. Such "consecutive" geometry allows installation of an RF collision cell or an additional trapping stage, but precludes other apparatus such as:

- an additional ion source (e.g. for introducing calibrant ions or ions of an opposite polarity);
- a window for introducing laser radiation;
- a surface for soft landing of ions (as described in WO03/105183);
- a surface for surface-induced dissociation (SID); or
- an electron source (e.g. for introducing electrons to effect electron capture dissociation (ECD), see WO02/078048 and WO03/102545).

An example of a tandem mass spectrometer having consecutive geometry is provided by WO02/48699. This spectrometer comprises an ion source, a series of ion traps, one of which is operated as a collision cell, followed by a TOF analyser. Tandem mass analysis and MSn is performed by using multiple reversal of ion movement. This is effected by trapping ions, releasing them in the reverse direction, fragmenting, trapping of fragments, and repeating the cycle to generate the required number of ion generations. However, finally the fragments must pass back through all the ion traps to make their way to the consecutively-arranged TOF analyser.

A tandem mass spectrometer with a consecutive, although unusual, geometry is described in WO97/48120. An ion source generates ions that are accelerated orthogonally into a TOF analyser. The ions are reflected by an ion mirror: some of the ions are collected by the TOF detector, whereas some continue to a reaction cell placed after the TOF analyser where they may be fragmented. The fragmented ions are reflected to return along the reverse path into the TOF analyser to be collected by the TOF detector. The reaction cell may fragment the ions in one of three ways: collision induced dissociation (CID), SID or photon induced dissociation (PID). Although this geometry offers greater flexibility in the design and operation of the reaction cell, its utility is limited because of high ion losses caused by the low duty cycle of orthogonal pulsing.

SUMMARY

Against this background, and from a first aspect, the present invention resides in a method of mass spectrometry using a mass spectrometer having a longitudinal axis, comprising the sequential steps of: (a) generating ions in an ion source; (b) extracting ions such that they travel along the longitudinal axis of the mass spectrometer in a forwards direction relative to the ion source; (c) causing the ions to enter and then to exit an intermediate ion store as the ions travel along the longitudinal axis in the forwards direction; (d) causing the ions to enter a reaction cell as they travel along the longitudinal axis in the forwards direction; (e) processing the ions within the reaction cell; (f) causing the processed ions to exit the reaction cell to travel back along the longitudinal axis in a backwards direction relative to the ion source; (g) causing the processed ions to enter the intermediate ion store once more as they travel along the longitudinal axis in the backwards direction and, optionally, trapping them therein; (h) causing one or more pulses of the processed ions to exit the intermediate ion store in an off-axis direction; (i) causing one or more pulses of the processed ions to enter a mass analyser; and (j) obtaining a mass spectrum of the one or more pulses of processed ions using the mass analyser.

It has been realised that efficient mass analysis of processed ions such as fragments requires matching of their emission to the operation of a mass analyser. As most high-performance mass analysers (e.g. FT ICR, TOF, orbitrap, etc.) are of an inherently pulsed nature, it is necessary to store ions for some time prior to injection into the mass analyser as pulses of ions. This could be done either using an additional ion store or incorporating such ion storage into the reaction cell. It has also been realised that the same ion storage could be re-configured not only to inject ions into the mass analyser, but also to do this in a direction that is substantially different from the direction of the ions' entrance (described in more detail below). In addition to simplicity of instrument layout, this arrangement advantageously avoids directing ions into the reaction cell when it is undesirable.

Generally, the duration of a pulse for ions of the same m/z should be well below 1 ms, and preferably below 10 microseconds. A most preferred regime corresponds to ion pulses shorter than 0.5 microsecond (this may be used for m/z roughly between 400 and 2000). Alternatively, and particularly for pulses of ions with a spread of m/z, spatial length of the emitted pulse should be less than 1 m, and preferably below 50 mm. A most preferred regime corresponds to ion pulses around 5-10 mm or even shorter. The most preferable regime is especially beneficial for electrostatic type mass analysers like the Orbitrap analyser and multi-reflection TOF analysers.

Of course, "ions" should not be construed as all ions within the mass spectrometer. This is consistent with the fact that some ions will inevitably be lost during transport, others will not be processed (i.e. they will remain unprocessed within the reaction cell) and others may not be detected by the mass analyser. However, there will be a group of ions that will undergo all of the above steps and so fall within the terms used.

The longitudinal axis of the mass spectrometer need not be linear, but should extend generally through the mass spectrometer. For example, the longitudinal axis may be curved in one or more parts, e.g. in a serpentine shape to produce a compact spectrometer.

Using such a geometry provides a flexible solution to the problems and the disadvantages of the prior art systems described above. Advantageously, ions are effectively reflected in the reaction cell such that they enter and exit from the same side. However, the ions are reflected back into an intermediate ion store from where they are ejected off axis to a mass analyser. As ions are transported into and out of the intermediate ion store along both axial directions, and are also ejected off-axis, then the intermediate ion store provides a junction in the ion paths through the mass spectrometer. The ions may be trapped in the intermediate ion store prior to ejection. This arrangement allows an effectively free choice of mass analyser, thereby overcoming the narrow applicability of WO97/48120 to orthogonal acceleration TOF analysers. Moreover, the benefits of the present invention are not restricted to tandem or MSn spectrometry, but enjoy wider application.

When the present method is used for tandem mass spectrometry, the ions are transported to the reaction cell where they are fragmented according to any known scheme, such as CID, ECD, SID and PID. This may include hard fragmentation, e.g. to fragment ions down to simple elements and their oxides, hydrides, etc. Moreover, the reflection geometry of the reaction cell makes a natural provision of an electron source for ECD straightforward (e.g. it may merely point straight back down the longitudinal axis) and likewise for a laser for PID or a surface for SID.

Moreover, the method may optionally further comprise, between steps (g) and (h), the steps of: allowing the ions to exit the intermediate ion store along the longitudinal axis in the backwards direction; optionally, providing additional ion selection; reflecting the ions such that they travel back along the longitudinal axis in the forwards direction such that the ions pass through the intermediate ion store once more and then enter the reaction cell; further processing the ions within the reaction cell; causing the processed ions to exit the reaction cell to travel back along the longitudinal axis in a backwards direction and to enter the intermediate ion store once more.

The processing and further processing steps may comprise fragmentation, thereby allowing $MS^3$ spectrometry. Causing further multiple reflections may allow the ions to be returned to the reaction cell for even more stages of fragmentation, such that the method may provide $MS^n$ spectrometry.

Preferably, step (c) further comprises trapping ions in the intermediate ion store after the ions have entered and then allowing the ions to exit. Trapping ions in the intermediate ion store may afford two benefits. First, ions may be accumulated over a period of time. Second, ions trapped in the intermediate ion store may be squeezed to form a compact bunch. This latter benefit is particularly advantageous where the ions are next ejected to the mass analyser, especially where focussing of the ion bunch is preferred, e.g. ejection from a curved linear quadrupole to an electrostatic analyser such as an Orbitrap analyser.

The intermediate ion store may be operated in a transmit mode such that ions travelling along the longitudinal axis in the forwards direction pass straight through the intermediate ion store.

Although fragmentation has already been described as an example of processing of ions in step (e), the present invention also extends to other forms of processing. Processing ions, in some embodiments of the invention, may be regarded as reacting the ions, i.e. causing an interaction involving ions to cause a change in those ions. In addition to causing a break-up of the ions through fragmentation, other changes to the ions may include their charge state changing. In a broader sense, processing ions may be regarded as changing the ion population in the reaction cell. This may be effected in many different ways. For example a fraction of the ion population may be removed, such as by mass analysis so that only ions within a desired mass range return to the intermediate ion store or by selection based upon ion mobility. Processing may comprise introducing further ions to the ion population. This may be done to introduce calibrant ions or to introduce ions of the opposite polarity. Also, processing may comprise altering the energy spread of the ion population. These processing steps may be performed on their own or in any combination.

Optionally, trapping the processed ions in step (h) comprises "cooling" the ions such that they lose energy. There are two preferred ways of achieving this. The first is by collisional cooling where a gas is introduced into the intermediate ion store such that the ions lose energy in low energy collisions (low enough to avoid further fragmenting the ions). The second is by the other well-known technique of adiabatic cooling.

Preferably, the method further comprises, between steps (b) and (c), the step of causing the ions to enter and then to exit an ion trap as they travel along the longitudinal axis in a forwards direction. Such an arrangement is particularly advantageous where the method further comprises trapping ions in the ion trap prior to allowing the ions to exit the ion trap along the longitudinal axis in the forwards direction. In this way, ions may be accumulated in the ion trap to a desired number prior to their release for processing in the reaction cell. The number of ions accumulated may be controlled, for example, using automatic gain control to ensure an optimum number of ions are obtained (there is a trade-off between the desire for as many ions as possible to ensure good statistics in the mass spectra and the deleterious effects of space charge if the concentration of ions is too high). The ion trap may also be used to collect a mass spectrum or spectra, and optionally to perform mass selection of ions passing through the ion trap, either in combination or in the alternative. Of course, the ion trap may be used in any of these ways during any of whatever number of passes the ions make through the ion trap. Where multiple passes of the ions along the mass spectrometer are used, the ion trap may be used to reflect the ions at the opposite end to the reflection performed by the reaction cell.

From a second aspect, the present invention resides in a mass spectrometer having a longitudinal axis, comprising: an ion source; ion optics operable to guide ions produced by the ion source along the longitudinal axis; an intermediate ion store located downstream of the ion source and having first and second apertures located on the longitudinal axis, such that the first aperture faces the ion source, and a third aperture located off axis; a reaction cell located downstream of the intermediate ion store and having an aperture that faces the second aperture of the intermediate ion store, wherein the reaction cell is operable to process ions; and a mass analyser located adjacent the intermediate ion store having an entrance aperture that faces the third aperture of the intermediate ion store, and wherein the intermediate ion store is operable to eject one or more pulses of ions out of the third aperture to the mass analyser.

The reaction cell may be operable to process ions, as described above. For example, the reaction cell may cause a change in the population of ions, may react the ions so as to cause a change in the ions, or may cause fragmentation of the ions.

With this arrangement, ions may be generated in the ion source, transported along the longitudinal axis in a forwards direction to pass through the first aperture of the intermediate ion store and then the second aperture of the intermediate ion store, and through the aperture of the reaction cell. The ions may then be reflected such that they re-emerge through the aperture in the reaction cell in the backwards direction, then to re-enter the intermediate ion store through the second aperture. The ions may then be ejected off axis through the third aperture.

The apertures may be provided by any suitable means. For example, the apertures may correspond merely to missing end faces of their associated part. Alternatively, they may correspond to holes provided in an electrode or the like, or by gaps left between electrodes or the like.

The ion source may be freely chosen from any commonly available types, such as an electrospray source, an electron impact source, a chemical ionisation source, atmospheric pressure photoionisation, MALDI (at atmospheric pressure, reduced pressure or in vacuum), a secondary ion source or any preceding stage of mass analysis or separation (e.g. DC or field-asymmetric ion mobility spectrometer, travelling wave spectrometer, etc.).

The intermediate ion store may be implemented in any number of ways. Examples include a 3D quadrupole ion trap or a storage multipole. Where a storage multipole is used, storage may be effected using RF potentials and, preferably, with RF switching as described in GB0413852.5. Whatever is chosen, it must be capable of both axial and off-axis ejection. Preferably, the off axis ejection is performed orthogonally, such that the third aperture of the intermediate ion store is located to allow such orthogonal ejection.

Optionally, the intermediate ion store has an associated gas supply for introducing gas into the intermediate ion store. The gas may be used in gas-assisted trapping of the ions.

In a currently preferred embodiment, the intermediate ion store is a curved linear ion store. Curved linear traps are advantageous in that they allow ejection of pulses of ions (i.e. fast ejection) without requiring further shaping. The curvature of the intermediate ion store may be used to focus ions ejected orthogonally from the ion store through the third aperture. Namely, the ions may be ejected normal to the ion path such that they travel toward the centre of curvature or are radially convergent. The ions may be ejected into an electrostatic mass analyser such as an Orbitrap analyser, optionally through a set of ion optics. The curvature of the intermediate ion store and the positioning of the Orbitrap analyser may be such that the ions are focussed at an entrance aperture of the Orbitrap analyser.

The reaction cell may take many different forms. The reaction cell may correspond to a gas-filled ion-molecule reactor or the reaction cell may have an ion source operable to introduce ions into the reactor cell. Molecules could be delivered in a gaseous state or as a beam of an excited species (molecules or atoms) from an external source (e.g. metastable atom source, or discharge, or spray with charged species eliminated by electric fields). Such a reaction cell could be used for modification or purification or fragmentation of the incoming ions. For fragmentation purposes, the reaction cell may further comprise an electron source for ECD, a surface for SID, ion source for ion-ion reactions (to facilitate, for example, proton transfer or electron transfer dissociation, ETD), a specific collision gas for CID or a beam of photons of any spectral range. Of course, a hybrid cell may be used having any combination of the features above.

Although electrostatic mass analysers, such as an Orbitrap analyser, have been described above, other types of mass analysers may be used. For example, the mass analyser may correspond to a FT-ICR cell or a TOF analyser.

Optionally, the mass spectrometer may further comprise an ion trap located between the ion source and the intermediate ion store and having apertures located on the longitudinal axis. The apertures are positioned to allow the passage of ions along the longitudinal axis. This ion trap may include a further mass analyser. This allows mass spectra of the precursor ions to be collected. The ion trap may be, for example, transporting elongated electrodes, magnetic sector or Wien filter, quadrupole mass filter, storage RF multipole resonant or mass-selective ion selection, 3D quadrupole ion trap or a linear ion trap.

Preferably, the mass spectrometer further comprises a controller operable to perform any of the methods described above. The present invention also extends to a computer program comprising computer program instructions that, when executed by the controller, cause the controller to perform any of the methods described above. The present invention extends still further to a computer storage medium having stored thereon such a computer program.

According to a still further aspect, the present invention resides in a mass spectrometer having a longitudinal axis, comprising: an ion source to direct ions along said axis; a reaction cell having an entrance aperture located on said axis; a mass analyser; and ion optics switchable between a first mode in which ions from the ion source are guided along said axis to said reaction cell and product ions produced in the reaction cell are guided to the mass analyser for analysis, and a second mode in which ions from the ion source are deflected from said axis and guided to the mass analyser for analysis without entering the reaction cell.

According to a yet still further aspect, the present invention resides in a mass spectrometer having a longitudinal axis, comprising: an ion source to direct ions along said axis; a reaction cell; a mass analyser having an entrance aperture located on said axis; and ion optics switchable between a first mode in which ions from the ion source are deflected from said axis and guided to the reaction cell and product ions produced in the reaction cell are guided back to said axis and to said entrance aperture of the mass analyser, and a second mode in which ions from the ion source are guided along said axis to the mass analyser for analysis without entering the reaction cell.

BRIEF DESCRIPTION OF THE FIGURES

In order that the invention may be more readily understood, reference will now be made, by way of example only, to the following drawings, in which.

DETAILED DESCRIPTION OF THE EMBODIMENTS

Figure 1:
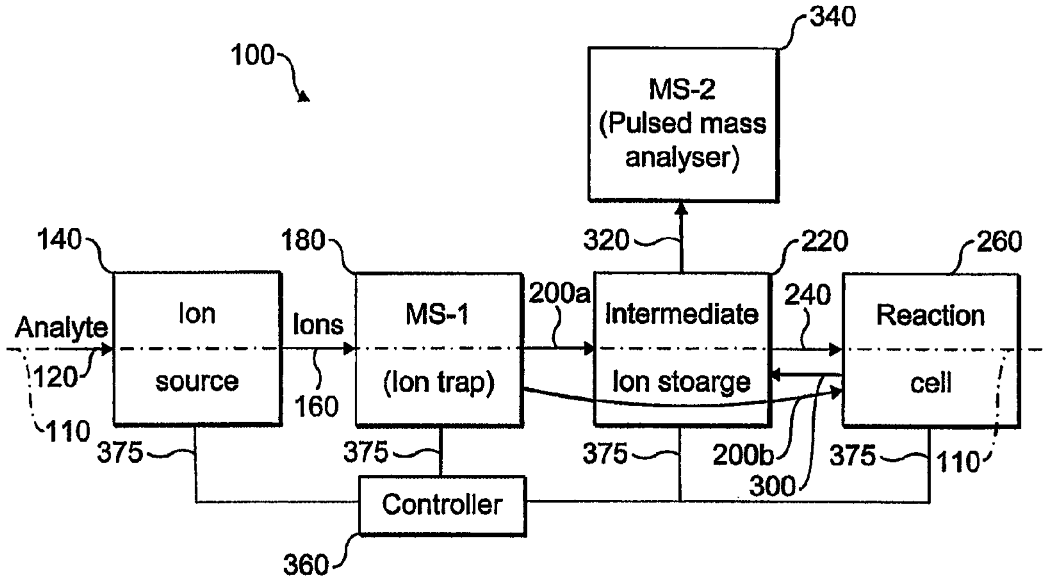
FIG. 1 is a schematic representation showing a generalised mass spectrometer in accordance with an embodiment of the present invention.

A mass spectrometer 100 having a longitudinal axis 110 is shown in FIG. 1. Most parts of the mass spectrometer 100 are positioned on the longitudinal axis 110. Starting with an ion source 140 and working downstream, the mass spectrometer 100 comprises the ion source 140, a first mass analyser 180 (an ion trap in this embodiment), an intermediate ion store 220 and a reaction cell 260. A second, pulsed mass analyser 340 is located off axis, adjacent to the intermediate ion store 220. The generalised representation of FIG. 1 does not show ion optics that may be used to guide ions between the various parts of the mass spectrometer 100. Moreover, FIG. 1 does not show the electrodes of the various parts that are used to guide and/or trap ions within those parts. A controller 360 is used to set potentials on the electrodes of the various parts and perform other control functions that allow the mass spectrometer 100 to function as commanded. The controller 360 communicates with the parts via connections 375.

The passage of ions through the mass spectrometer 100 is also shown in FIG. 1. An analyte 120 is introduced into the ion source 140 where it is ionised to form analyte ions 160 that exit the ion source 140. The ions 160 then enter the ion trap 180. This embodiment is described in the context of tandem mass spectrometry, although it is to be understood that the present invention enjoys wider application. Thus, the ion trap 180 provides a mass spectrometer capability to obtain a mass spectrum from the ions 160 under the direction of the controller 360. The ions 160 are then mass selected such that only ions 200*a,b* within a certain mass range exit the ion trap 180.

Advantageously, the mass spectrometer 180 may be used to implement automatic gain control, i.e. to ensure an optimum number of ions are accumulated. This optimum is a compromise between a desire for as many ions as possible to ensure good experimental statistics and the need to limit ion concentrations to avoid space charge effects. Automatic gain control may be used to control the ion abundance in the intermediate ion store 240, the reaction cell 260 or the mass analyser 340. Automatic gain control is described in U.S. Pat. No. 5,107,109 and U.S. Pat. No. 6,987,261.

The next step sees the mass spectrometer 100 used in two different ways. In a first mode, ions 200*a* are transported into the intermediate ion store 220 where they are trapped. Once a suitable time delay has passed, the controller 360 transports the ions 240 to the reaction cell 260. In a second mode, the intermediate ion store 220 is used merely as an ion guide ("transmission mode"). The intermediate ion store 220 may be filled with gas, thereby reducing the energy of the ions 200*b* through collisional cooling as they pass through the intermediate ion store 220 and enter the reaction cell 260.

The controller processes the ions 240 once in the reaction cell 260. The processing may take any number of forms, as will be described below. The processed ions 300 are returned to the intermediate ion store 220 by the controller 360. In this embodiment, the intermediate ion store 240 traps the processed ions 300 prior to ejecting the ions 320 off axis such that they are radially convergent. Thus the ions are focussed as they pass from the intermediate ion store 220 to the mass analyser 340. Alternatively, the processed ions 300 are merely deflected from the axis 110 to follow path 320 to the mass analyser 340. The controller 360 then uses the mass analyser 340 to collect one or more mass spectra from the processed ions.

Figure 2:
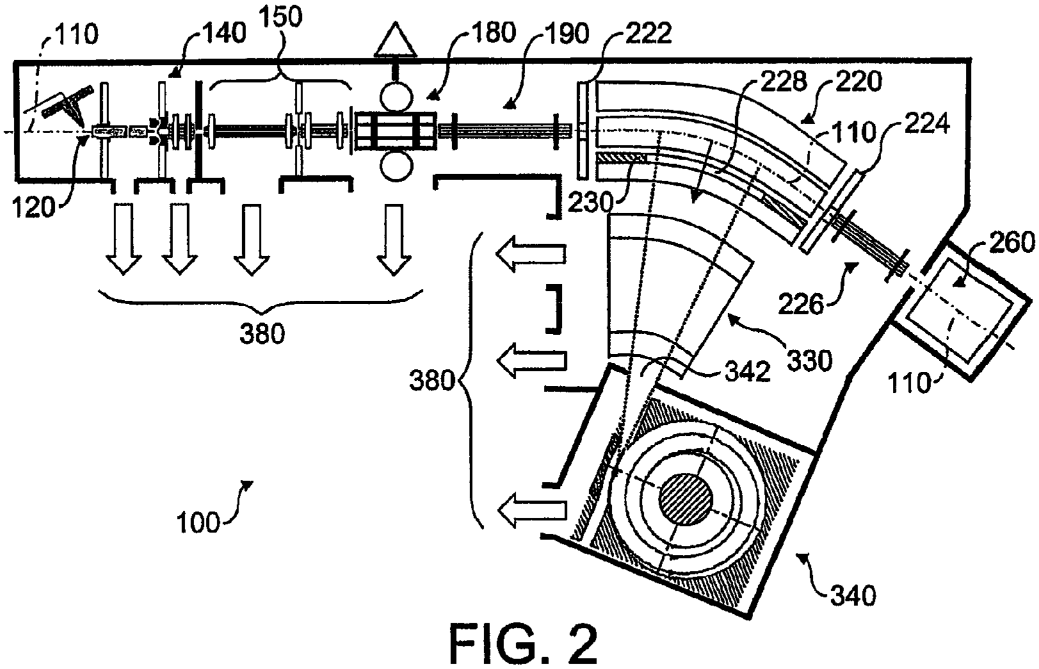
FIG. 2 is a more detailed representation of a mass spectrometer in accordance with an embodiment of the present invention.

FIG. 2 shows in more detail an embodiment of the present invention, again in the context of a tandem mass spectrometer comprising a first mass analyser provided by an ion trap 180 and a second mass analyser provided by an Orbitrap analyser 340 (an electrostatic analyser). FIG. 2 is not to scale.

The mass spectrometer 100 is generally linear in arrangement, with ions passing along the longitudinal axis 110. The front end of the spectrometer 100 comprises a conventional ion source 140, supplied with analyte ions 120. Ion optics 150 are located adjacent the ion source 140, and are followed by a linear ion trap 180. Further ion optics 190 are located beyond the ion trap 180, followed by a curved quadrupolar linear ion trap 220 bounded by gates 222 and 224 at respective ends. This ion trap 220 provides the intermediate ion store 220. Ion optics 226 are provided adjacent the downstream gate 224 to guide ions to and from the reaction cell 260.

The curvature of the intermediate ion store 220 is used such that when the ions are ejected off axis, the ions are radially convergent. The ions are ejected off-axis in the direction of the entrance 342 to an Orbitrap mass analyser 340. The ions are ejected through an aperture 228 provided in an electrode 230 of the intermediate ion store 220 and through further ion optics 330 that assist in focussing the emergent ion beam. It will be noted that the curved configuration of the intermediate ion store 220 also assists in focussing the ions. Furthermore, once ions are trapped in the intermediate ion store 220, potentials may be placed on the gates 222 and 224 to cause the ions to bunch in the centre of the intermediate ion store 220. This also assists focussing. The curved linear ion trap 220 is inherently useful as it allows rapid ejection of pulses of ions to the mass analyser 340 with little, if any, further shaping required.

In operation, ions 160 are generated in the ion source 140 and transported through ion optics 150 to be accumulated temporarily in the ion trap 180 according to e.g. US20030183759 or U.S. Pat. No. 6,177,668. Ion trap 180 contains 1 mTorr of helium such that the ions 160 lose some of their kinetic energy in collisions with the gas molecules.

Either after a fixed time delay (chosen to allow sufficient ions 160 to accumulate in the ion trap 180) or after sufficient ions 160 have been detected in the ion trap 180, ions 200*a* are ejected from the ion trap 180 to travel through ion optics 190 and into the intermediate ion store 220. Ions 200*b* will pass through the intermediate ion store 220 into the reaction cell 260 where they are processed before being returned back to the intermediate ion store 220.

Cooling gas is introduced into the intermediate ion store 220. Nitrogen, argon, helium or any other suitable gaseous substance could be used as a cooling gas, although helium is preferred for the ion trap 180 and nitrogen for the intermediate ion store 220 of this embodiment. Typically, 1 mTorr of nitrogen is used in the intermediate ion store 220. The pumping arrangement used, indicated by the pumping ports and arrows 380, ensures that other components are substantially free of gas and kept at the required high vacuum. Transfer of ions into intermediate ion store 220 could be realised as described in co-pending patent application GB0506287.2.

Various parts of the mass spectrometer 100 will now be described in more detail.

The ion source 140 may be any one of the commonly available types. For example, electrospray, atmospheric pressure photoionisation or chemical ionisation, atmospheric pressure/reduced pressure/vacuum MALDI, electron impact (EI), chemical ionisation (CI), secondary ion, or any preceding stage of mass analysis or ion selection (e.g. DC or field-asymmetric ion mobility spectrometer, travelling wave spectrometer, etc.) would all be suitable choices.

The ion trap 180 may also be chosen from a number of options. The skilled person will appreciate that the choice may be made in accordance with the experiments to be performed. Options include transporting elongated electrodes, magnetic sector or Wien filter, quadrupole mass filter, storage RF multipole with resonant or mass-selective ion selection, 3D quadrupole ion trap, or linear trap with radial or axial ejection.

Suitable types of ion traps/ion stores to use in the intermediate ion store 220 include 3D quadrupole ion traps, storage RF multipoles without RF switching, storage multipoles according to U.S. Pat. No. 5,763,878 or US20020092980A1, storage RF quadrupole with RF switching according to GB0413852.5, ring traps, stack traps or static traps.

The intermediate ion store 220 may be operated in a number of ways. For example, intermediate ion store 220 could operate in ion capture mode (the traditional way of operating ion traps). Alternatively, the intermediate ion store 220 could operate in ion transmission mode to allow ions to reach the reaction cell 260 and in capture mode on their way back. A further alternative is for the intermediate ion store 220 to operate in transmission mode for multiple ion bounces between the ion trap 180 and the reaction cell 260, and then could be switched into the capture mode after a pre-determined number of bounces. Each bounce could involve a different type of processing in ion trap 180 or reaction cell 260.

Where ion trap 180 is used to trap ions, multiple ion ejections from the ion trap 180 into the intermediate ion store 220 per each cycle of mass spectrometry in the mass analyser 340 are possible to accumulate a larger ion population.

In the embodiment of FIG. 2, a curved or straight gas-filled quadrupole 220 has switchable RF potentials applied to its electrodes and time-dependent voltages on gates 222 and 224. These potentials and RF offsets are changed to switch from one regime of operation to another: sufficiently high potentials reflect the ion beam thus blocking its further propagation. Also, these potentials could be ramped up prior to ion ejection in order to squeeze the ion bunch. Ions are ejected into the mass analyser 340 through the aperture 228 in electrode 230 by switching the RF off and applying a DC gradient between the electrodes.

The mass analyser 340 may be a FT-ICR cell, a TOFMS of any type or an electrostatic trap like an Orbitrap analyser.

The reaction cell 260 will now be described in more detail and with reference to FIGS. 3, 4 and 5 that show exemplary embodiments. The reaction cell 260 may take one of many forms that effectively operate on the population of ions within the reaction cell 260 to change that population in some way. The ions themselves may change (e.g. by fragmentation or reaction), ions may be added (e.g. calibrants), ions may be removed (e.g. by mass selection), or properties of the ions may change (e.g. their kinetic or internal energy, etc.). Thus, the reaction cell 260 may be any one of a number of possibilities to meet these functions.

Figure 3:
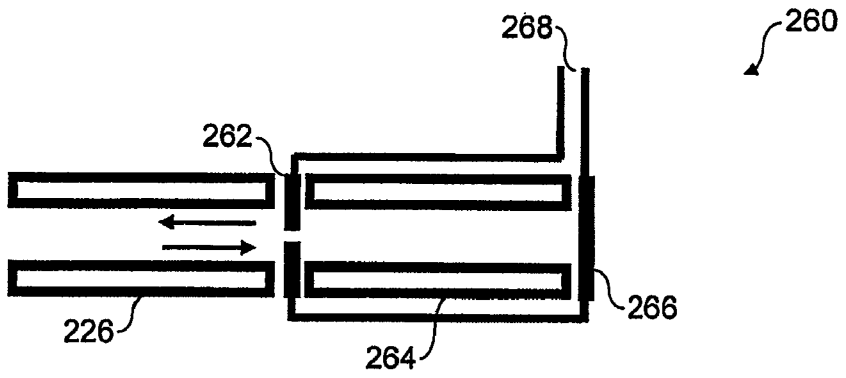
FIG. 3 is a representation of a reaction cell for use in the mass spectrometer of FIGS. 1 and 2, in the form of a gas-filled cell.

FIG. 3 shows a reaction cell 260 in the form of a gas-filled collision cell for high-energy CID, along with ion optics 226 operable to guide ions into and out from the reaction cell 260. Admission and retention of ions within the reaction cell 260 is controlled by gate electrode 262. Trapping of ions within the reaction cell 260 is assisted by a trapping RF quadrupole 264. A trap electrode 266 located at the opposite end to the gate electrode 262 completes the trapping arrangement. A gas supply 268 is used to introduce a gas into the reaction cell 260.

In operation, ions are mass selected in the ion trap 180, transported through the intermediate ion store 220 at low energies, are then accelerated by the ion optics 226 up to energies of about 30-50 eV/kDa. The ions then enter the reaction cell 260 where they collide with gas molecules and fragment. The fragmented ions are trapped in the reaction cell 260. Preferably, the reaction cell 260 is operated such that the product of gas pressure P (mbar) and ion depth of penetration L (mm) exceeds 0.1 mbar.mm, most preferably-1 mbar.mm. The fragmented ions, and any precursor ions, are ejected from the reaction cell 260 by suitable manipulation of DC voltages (on the gate electrode 262 and trap electrode 266). These ions are then trapped in the intermediate ion store 220, before being transported to the mass analyser 340.

Operation in this reflection mode allows the following two applications. First, high-energy fragmentation of precursor ions, including parallel fragmentation of all ions. Prior to fragmentation, some of the background peaks or wide ranges of the mass spectrum may be excluded using mass selection in the ion trap 180. Second, analysis of low-mass immonium ions and precursor ion scans using the ion trap 180 and mass analyser 340.

The reaction cell 260 of FIG. 3 may also be operated as a gas-filled ion-molecule reactor. In this method, ions are introduced into the reaction cell 260 at lower energies. The trapped ions enter into reactions (e.g. charge exchange) with an active reactant introduced with the collision gas. Examples of reactant gas include methane, water vapour (inc. deuteriated), alkyl bromides, alcohols, ethers, ketones, amines (e.g. triethylamine), etc. Another application is specifically reacting an isotopically labelled gas with a specific ion(s) functional group (e.g. a phosphate) to label ions having this group. Labelled ions could be ear-marked for subsequent fragmentation, either at once for analysis in the mass analyser 340 or sequentially in the ion trap 180. In both applications, the extent of the reaction may be regulated by the duration of trapping within the reaction cell 260 and the pressure of reactant. Low-pressure electrical discharge could be also employed to provide activation and fragmentation.

Figure 4:
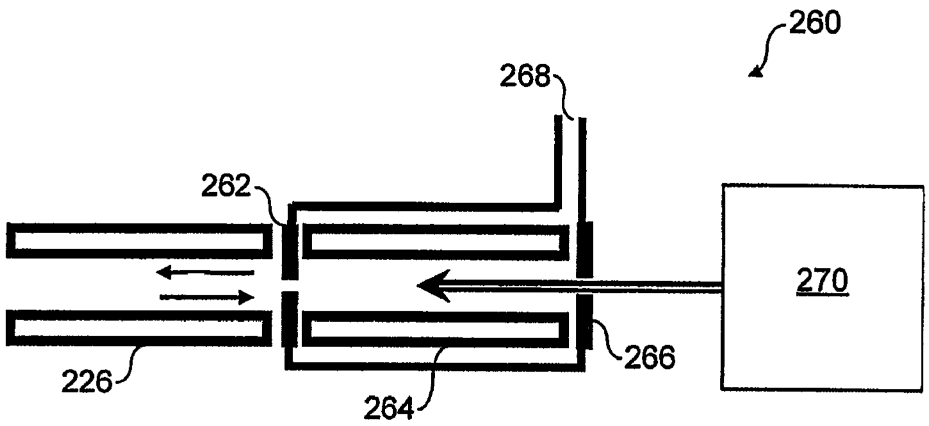
FIG. 4 is a representation of a reaction cell for use in the mass spectrometer of FIGS. 1 and 2, having an auxiliary source of ions, or neutral atomic or molecular beams, or beams of photons.

FIG. 4 shows a reaction cell 260 fed by ion optics 226 (an RF octopole). The reaction cell 260 has a trapping RF quadrupole 264 bounded by a gate electrode 262 at one end and a trap electrode 266 at the other end. A gas supply 268 is also provided, along with an ion source 270. This ion source 270 may be used to introduce further ions of the same polarity to those already trapped in the reaction cell 260. Alternatively, the ion source 270 may be used to introduce ions of an opposite polarity ("reactant ions"). Preferably, ions of each polarity are introduced sequentially: e.g. positive ions first, then negative ions. Ions of both polarities are trapped within the reaction cell 260 by applying suitable RF potentials to the gate electrode 262 and the trap electrode 266. Ions of both polarities could be transported to react in the ion trap 180 or in the intermediate ion store 220 (or they could react in the reaction cell 260). An example of such reaction is electron-transfer dissociation, ETD (J. E. P. Syka, J. J. Coon, M. J. Schroeder, J. Shabanowitz, D. F. Hunt, Proc. Nat. Acad. Sci., 101 (2004) 9528-9533).

Reaction might involve more than one stage. For example, positive precursor ions could produce negative product ions in reaction with negative reactant ions. These negative product ions, in their turn, could be transformed into positive further products by reacting with positive reactant ions delivered by an appropriately switched ion source 270. This way, multi-stage reactions are made possible. Among other advantages, this allows an increase in the charge state of resulting ions, thus allowing ECD or ETD on normally singly-charged ions produced by MALDI.

Reactant ions could be delivered also from the original ion source of the mass spectrometer e.g. by switching polarity of the entire ion source and ion path. This allows to mass-selection of desired reactant ions. During polarity switching, precursor ions remain stored in the reaction cell 260 and therefore are not affected. To accelerate polarity switching, it is preferable to have both polarities of ions continuously generated within the ion source (e.g. by having two sprayers at opposite polarities), with only one polarity transmitted at any given time.

Instead of ion source 270, one could use an emitter producing any other type of beams: excited (e.g. metastable) or cooled molecules or atoms or clusters, etc., photons of any spectral range. In this case, they could be directed not only along the axis, but also at an angle to it. These beams could be pulsed or continuous. Among examples of photon beams, femtosecond UV- or visible-light or IR pulse trains, vacuum UV or nanosecond UV pulses are the most preferable.

Figure 5:
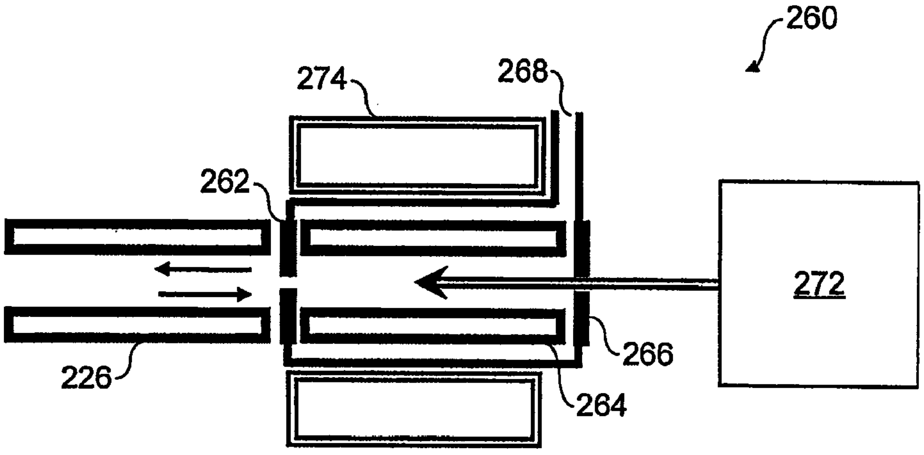
FIG. 5 is a representation of a reaction cell for use in the mass spectrometer of FIGS. 1 and 2 for ECD.

FIG. 5 shows a reaction cell 260 operated as a collision cell for hard fragmentation to provide elemental analysis of biomolecular ions. The reaction cell 260 is supplied with ions via ion optics 226 (a RF octapole). The reaction cell 260 traps ions using a trapping RF quadrupole 264 bounded by a gate electrode 262 and a trap electrode 268. Gas may be provided through gas supply 268. The reaction cell 260 is also provided with a laser source 272.

Hard fragmentation, preferably down to simple elements or their oxides, hydrides, etc., is achieved by subjecting ions to high-intensity pulses of laser light provided by laser source 272. Alternatively, a glow discharge may be used to cause the hard fragmentation. While irradiated by photons, ions could be stored in the RF quadrupole 264. The mass range of stored ions may be improved in favour of low-mass ions by an additional axial magnetic field that may be provided by a permanent magnet 274.

The reaction cell 260 of FIG. 5 may be adapted for use in ECD by substituting an electron source for the laser source 272. The electron source 272 can be used to introduce low-energy electrons into the reaction cell 260 to cause ECD. However, the presence of an RF trapping field is undesirable as it excites the electrons to high energies and this materially alters the way in which the ions fragment. To overcome this problem, the ions are trapped in the reaction cell 260 using a magnetic field provided by the permanent magnet 274. Once ECD is complete, electric fields may be used to assist trapping and/or effect ejection of the ions from the reaction cell 260.

In another embodiment, the reaction cell 260 comprises a DC or field-asymmetric ion mobility spectrometer. Preferably, such reaction cell includes RF-only linear ion traps on both sides of the separation tube. In either case, the spectrometer is operated in two passes: first, from the entrance trap towards the back trap, and then in reverse. On one or both passes, only ions with a specific mobility or charge state are allowed to pass (i.e. the spectrometer acts as a filter). The second pass could be also used for fragmenting ions selected on the first pass that is achieved by significantly increasing DC offset of the back trap relatively to the entrance trap (e.g. above 30-50 V per kDa of selected m/z).

The reaction cell 260 may also be used for SID. For example, the reaction cell 260 of FIG. 3 may be operated such that the trap electrode 266 provides a collision surface to effect fragmentation through SID. For example, self-assembled monolayers of various organic molecules are known to provide good efficiency of fragmentation. The combination of this SID with trapping of ions using the trapping RF quadrupole 264 and collisional cooling (via gas supply 268) ensures better transmission of ions back into the intermediate ion store 220 and better flexibility in the choice of collision energy. Alternatively, the trap electrode 266 may be used as a surface for ion soft-landing and preparatory mass spectrometry, as described in WO03/105183. In this case, ions could be deposited on the trap electrode 266 while quality control is carried out by concurrent analysis in the mass analyser 340 or by analysing ions desorbed from the surface (e.g. by a laser).

Also, the reaction cell 260 may comprise a further mass analyser. Of course, various combinations of the features contributing to the reaction cells 260 described above may be employed.

As will be appreciated by those skilled in the art, various modifications may be made to the embodiments described above without departing from the scope of the present invention that is defined by the appended claims.

For example, inclusion of the first mass analyser 180 is optional. This part may merely be an ion trap with no mass analysis function, or this part may be omitted entirely.

The invention claimed is:

1. A mass spectrometer, comprising:

an ion source for generating ions;

an intermediate ion store positioned to receive ions from the ion source through a first end, the intermediate ion store extending along a longitudinal axis from the first end to a second end;

a collision/reaction cell having an inlet/outlet aperture through which ions enter and exit positioned adjacent the second end of the intermediate ion store; and a mass analyzer positioned to receive ions ejected off-axis from the intermediate ion store.

2. The mass spectrometer of claim 1, wherein the intermediate ion store is curved concavely toward an inlet of the mass analyzer.

3. The mass spectrometer of claim 2, further comprising a mass selector positioned between the ion source and the intermediate ion store for selectively passing ions within a particular range of mass-to-charge ratios.

4. The mass spectrometer of claim 3, wherein the mass selector includes a two-dimensional ion trap.

5. The mass spectrometer of claim 2, wherein the collision/reaction cell is configured to fragment ions received from the intermediate ion store by collision induced dissociation.

6. The mass spectrometer of claim 2, wherein the collision/reaction cell is configured to fragment ions by ion-ion reactions.

7. The mass spectrometer of claim 2, wherein the collision/reaction cell includes at least one electrode positioned at an end opposite to the inlet/outlet aperture, the electrode having a potential applied thereto to reflect ions toward the inlet/outlet aperture.

8. The mass spectrometer of claim 2, wherein the mass analyzer includes an electrostatic trap analyzer.

9. The mass spectrometer of claim 2, wherein the mass analyzer includes a time-of-flight (TOF) mass analyzer.

10. The mass spectrometer of claim 2, wherein the collision/reaction cell is configured to separate ions according to their ion mobilities.

11. The mass spectrometer of claim 10, wherein the collision reaction cell includes a separation tube interposed between front and rear ion traps.

12. The mass spectrometer of claim 2, wherein the collision/reaction cell is configured to fragment ions by electron capture dissociation.

13. The mass spectrometer of claim 2, wherein the intermediate ion store includes at least four elongated rod electrodes.

14. The mass spectrometer of claim 2, wherein the intermediate ion store includes a plurality of ring electrodes arranged in stacked relation.

* * * * *